(12) United States Patent
Adams et al.

(10) Patent No.: US 7,962,429 B2
(45) Date of Patent: Jun. 14, 2011

(54) NEUROMORPHIC DEVICE FOR PROOFREADING CONNECTION ADJUSTMENTS IN HARDWARE ARTIFICIAL NEURAL NETWORKS

(76) Inventors: Paul Adams, Stony Brook, NY (US); Kingsley J. A. Cox, Stony Brook, NY (US)

( * ) Notice: Subject to any disclaimer, the term of this patent is extended or adjusted under 35 U.S.C. 154(b) by 574 days.

(21) Appl. No.: 12/127,565

(22) Filed: May 27, 2008

(65) Prior Publication Data

US 2008/0294580 A1 Nov. 27, 2008

Related U.S. Application Data

(60) Provisional application No. 60/940,018, filed on May 24, 2007.

(51) Int. Cl.
*G06N 5/00* (2006.01)
(52) U.S. Cl. ............................................. 706/25; 706/45

(58) Field of Classification Search .................... 706/25, 706/45
See application file for complete search history.

(56) References Cited

OTHER PUBLICATIONS

Hu, Noniterative Learning in Perceptrons Implemented by an Ultrafast-Learning Character-Recognition Scheme, Neural Networks, 1996, IEEE International Conference on, Jun. 3, 1996., pp. 1506-1509.*

* cited by examiner

*Primary Examiner* — Wilbert L Starks, Jr.
(74) *Attorney, Agent, or Firm* — F. Chau & Associates, LLC; Nathaniel T. Wallace (57) ABSTRACT

A hardware-implemented method for proofreading updates of connections in a hardware artificial neural network (hANN) includes computing a draft weight change independently at a connection between neuroids and at a corresponding dedicated special purpose nousoid, determining whether the draft weight changes agree, and executing a weight change at the connection equal to the draft weight change upon determining that the draft weight changes agree.

12 Claims, 3 Drawing Sheets

NEUROMORPHIC DEVICE FOR PROOFREADING CONNECTION ADJUSTMENTS IN HARDWARE ARTIFICIAL NEURAL NETWORKS

CROSS-REFERENCE TO RELATED APPLICATIONS

This application claims the benefit of Provisional Application No. 60/940,018 filed on May 24, 2007 in the United States Patent and Trademark Office, the contents of which are herein incorporated by reference in its entirety.

BACKGROUND

1. Technical Field

The present invention relates to artificial neural networks, and more particularly to proofreading connection adjustments in hardware artificial neural networks.

2. Discussion of Related Art

Artificial Neural Networks (ANNs) are powerful computational tools loosely based on information processing in the brain, with widespread applications. The key ingredients in ANNs are (1) neuron-like signaling elements ("neuroids") interconnected by variable-strength connections (analogous to synapses) and giving outputs that represent computational results, (2) the neuroids typically compute weighted sums of their inputs (although their outputs may be some nonlinear function of these weighted sums), and (3) connection strengths can be modified as a result of ongoing computations so that the ANN "learns" to perform the desired computation. The core operations performed by a neuroid are the weighted input sum operation and the weight update operation. The weighted input sum operation is a "dot product" representing an Euclidian measure of the similarity between the current input vector and the stored weight vector, while the weight update operation allows improvements in performance by learning.

Although most current ANNs are implemented in software in conventional serial computers, ANNs can be implemented using a variety of techniques, such as in massively parallel hardware so that the resulting hANN (hardware ANN) compute vast numbers of high dimensional dot products and weight improvements essentially instantaneously, like the brain.

Implementation in hardware inevitably means that some of the steps in the computations may be imperfectly executed, a possibility which is not permitted in conventional Turing-von Neumann serial computers. Indeed, the inevitably of noise and errors in nanoscale components is one reason why neuromorphic, hANN approaches have been advocated, since they are more noise and error-resistant than conventional approaches.

Regardless of the implementation, a key step in most ANNs is training by adjusting connection strengths according to some well-defined recipe. One known recipe is the generalized Delta rule (part of "back propagation"), in which a connection changes according to the product of its input value and the difference between its current and desired output value. The closely related "general Hebbian" rule is also widespread, where changes are made according to the product of the input value and some (possibly nonlinear function of) the output value.

In all cases, if ANNs are to be realized in hardware, the connections, and their learning rule, must be physically implemented. This means that the learning rule, whether Delta or Hebb or something else, must be local in that the signals that produce the connection adjustment must be present at the actual connections themselves. Of course, this is not difficult to achieve, since by definition the connection brings together the input and output signals, the key components of the update rule. The term "Hebbian" is used generally herein to cover all cases where the local update depends on the local activity.

In any hardware implementation any massively parallel ANN will have a high density of physical connections, where physically neighboring connections might influence each other, so that the learning rule will not be completely local. For example, heat generated at the connections either during the readout process, or, more likely, during updates (typically the energy needed to update is much higher than the energy needed to read out, ensuring that readout alone does not perturb connection strengths), could travel along connecting wires to "nearby" connections. Since massively parallel hANNs must be efficiently wired, wires will be short and therefore good heat conductors. The slight nonlocality of the learning rule in hANNs has no particular relation to the task the hANN is designed to perform: it will inevitably degrade performance, and might completely prevent useful operation. This problem has hitherto been somewhat neglected in practical ANNs, since in serial implementations it does not arise, while in prototype hANN devices the connection density has been low as to not incur non-local influence. A second, related, problem is that in physically small (e.g., nanoscale) connections, strength adjustments may be a noisy function of the current input and output values even though the adjustments at individual connections may occur independently. While careful design will minimize this "update noise" problem, eliminating it will increase the bulk of the individual connections, lowering the power of the massively parallel ANN.

Therefore, a need exists for proofreading connection adjustments in hardware artificial neural networks.

SUMMARY OF THE INVENTION

According to an embodiment of the present disclosure, a hardware-implemented method for proofreading updates of connections in a hardware artificial neural network (hANN) includes computing a draft weight change independently at a connection between neuroids and at a corresponding dedicated special purpose nousoid, determining whether the draft weight changes agree, and executing a weight change at the connection equal to the draft weight change upon determining that the draft weight changes agree.

According to an embodiment of the present disclosure, a computer readable medium embodying instructions is provided executable by a processor to perform a method for proofreading updates of connections in a hardware artificial neural network (hANN).

According to an embodiment of the present disclosure, a hardware artificial neural network (hANN) includes a plurality of pairs of neuroids connected by a connection, a plurality of nousoids corresponding to the pairs of neuroids, wherein each nousoid is connected to the connection between a corresponding pair of neroids and is separately connected to an output of one of the neroids of the corresponding pair of neroids, each nousoids for computing a draft weight change independently of corresponding pair of neroids and determining whether the draft weight change agrees with a second draft weight change determined by corresponding pair of neroids, and wherein the corresponding pair of neroids executes a weight change at the connection equal to the draft weight change upon a determination that the draft weight changes agree.

BRIEF DESCRIPTION OF THE DRAWINGS

Preferred embodiments of the present invention will be described below in more detail, with reference to the accompanying drawings.

DETAILED DESCRIPTION OF EXEMPLARY EMBODIMENTS

The present disclosure is directed towards a system and method for making connection adjustments and preferably error-free connection adjustments. Proofreading is implemented, wherein a draft version of information is read by a reader that is in some sense independent of the originator of the information; if the proofreader flags no errors the draft is printed.

In a hardware ANN (hANN) according to an embodiment the present disclosure, every physical connection is accompanied by a neuron-like device called a nousoid. Typically, each connection has a dedicated nousoid. In very large pulse-coded networks different connections can share the same nousoid if the pulses are sufficiently sparse (e.g., sparse in the sense that the neuroid firing rate is low with the result that the probability that 2 sets of connected and coincidently firing neuroids that share the same nousoid will activate that nousoid simultaneously, will be low). Unlike the neuroids of the ANN, which can compute weighted sums of their inputs, nousoids compute products of their inputs (e.g., a pair of inputs). If the ANN uses a generalized Hebbian learning rule, these nousoid inputs are the inputs and outputs of the neuroids contributing to the corresponding connection (see FIG. 1). If the ANN uses a generalized Delta rule, the nousoid inputs are also the signals at the appropriate connection that produce connectional update (i.e., the input to the connection and the difference between the output at the connection and the desired output). More generally, whatever the local signals at the connection that produce learning—connectional adjustment—, the same signals are supplied to the appropriate nousoid. The nousoid then computes the same function of its input signals that is used to update the connection; this nousoid output signal is fed back to both the input and output neuroids, where it is used to control learning at the connection where the input and output neuroids intersect. Because the nousoid repeats the product computation already done at the Hebbian or Delta connections, and only allows updating of the connection if both computations agree, it functions as a proofreading device.

According to an embodiment of the present disclosure, in an hANN it is more efficient and cheaper to perform the same computation sloppily but twice than to perform it exactly but only once. Further, rather than doing the same computation twice in series (for example, by running every pattern twice through the network and averaging the weight changes), the computation is performed as two versions in parallel, using two different devices subject to different errors. According to an embodiment of the present disclosure, this approach is particularly well suited to hANNs that learn online in real time, wherein repeating computations is not possible due to time constraints.

The term "nousoid" is used because this term was also used to describe a related neuron-like component used in a previous patent (U.S. Pat. No. 7,080,053). In that patent nousoids (also termed "K cells") were also used to control connection adjustments, and they also computed a "mirror" but independent copy of the connectional updating signal. However, in that patent true proofreading was not done, since the nousoid feedback signal was used to modulate either the connectional input signal or the connectional output signal, but not both (in that Patent it was noted that input control or output control could be combined in the same device, but using 2 separate types of nousoid; in the present device, only one type of nousoid is used). One could refer to the primitive proofreading done as part of U.S. Pat. No. 7,080,053 as semi-proofreading, herein incorporated by reference in its entirety. The present disclosure describes a more sophisticated, powerful and general full proofreading device that can be used as part of a machine that evolves new connections, or one with fixed connections. If used in conjunction with machinery that forms new connections, embodiments of the present disclosure may be supplemented with features from U.S. Pat. No. 7,080,053, and can also be more generally used in hANNs.

An issue is whether such update errors would impair, or even prevent, the operation of a hANN. Results suggest that if the learning rule is nonlinear, errors can be catastrophic. An efficient and simple way of improving the locality and accuracy of connectional adjustments in hANNs is thus highly desirable.

Although in principle the connections of a hANN can be updated in an analog fashion, according to the exact value of the function of the current input and output values specified by the learning rule, digital updates can be implemented for simplicity and efficiency. Thus, an individual connection will, within a given time step, either be increased by a quantal amount dw, or not, in such a manner that on average the learning rule is implemented exactly. Embodiments of present disclosure are particularly well suited to hANNs which physically implement such a digital version of the learning rule, although embodiments can also be applied more generally.

Herein, the term "connection" is used rather than "synapse" since in the brain many synapses may connect a pair of neurons. Similarly, in hANNs it may be more efficient to use many parallel binary devices ("synapsoids") to represent a connection of multibit strength.

It is to be understood that the exemplary system modules and method steps described herein may be implemented in various forms of hardware, firmware, nanotechnology or special purpose processors. The application may be executed in a variety of different architectures, a common feature of which is that connections (or connection-like devices) are updated, adjusted or changed, on the basis of the local signals arriving at that connection according to a local activity-dependent learning rule.

The term "connection" used herein is a physical junction between two neuroids, or their wire-like extensions, herein called wires. Connection strength is used in dot-product operations or comparable operations of hANNs, the strength being adjusted on the basis of ongoing neuroid activity arriving at that connection (typically via wires). For every existing and modifiable connection in the ANN, a corresponding device call a nousoid exists, which computes exactly the same function of the connectional local neuroid-derived signals as that used to calculate the connectional update itself.

Each connection has a dedicated nousoid. In very large pulse coded networks connections may share a nousoid, provided that pulse coincidences at connections are rare. The nousoid acts as a mirror device which computes an update signal that is theoretically identical to the intended or "draft" connectional update signal. For example, referring to FIG. 1, if a connection (103) between neuroid j (101) and neuroid I (104) is to be updated by an amount proportional to the product $x_j x_i$ ($x_{j,i}$ are the current activities of neuroids j and i) as in Hebbian learning, then the nousoid $K_{i,j}$ (107) which corresponds to the connection i,j (103) also computes the product $x_j x_i$.

Figure 1:
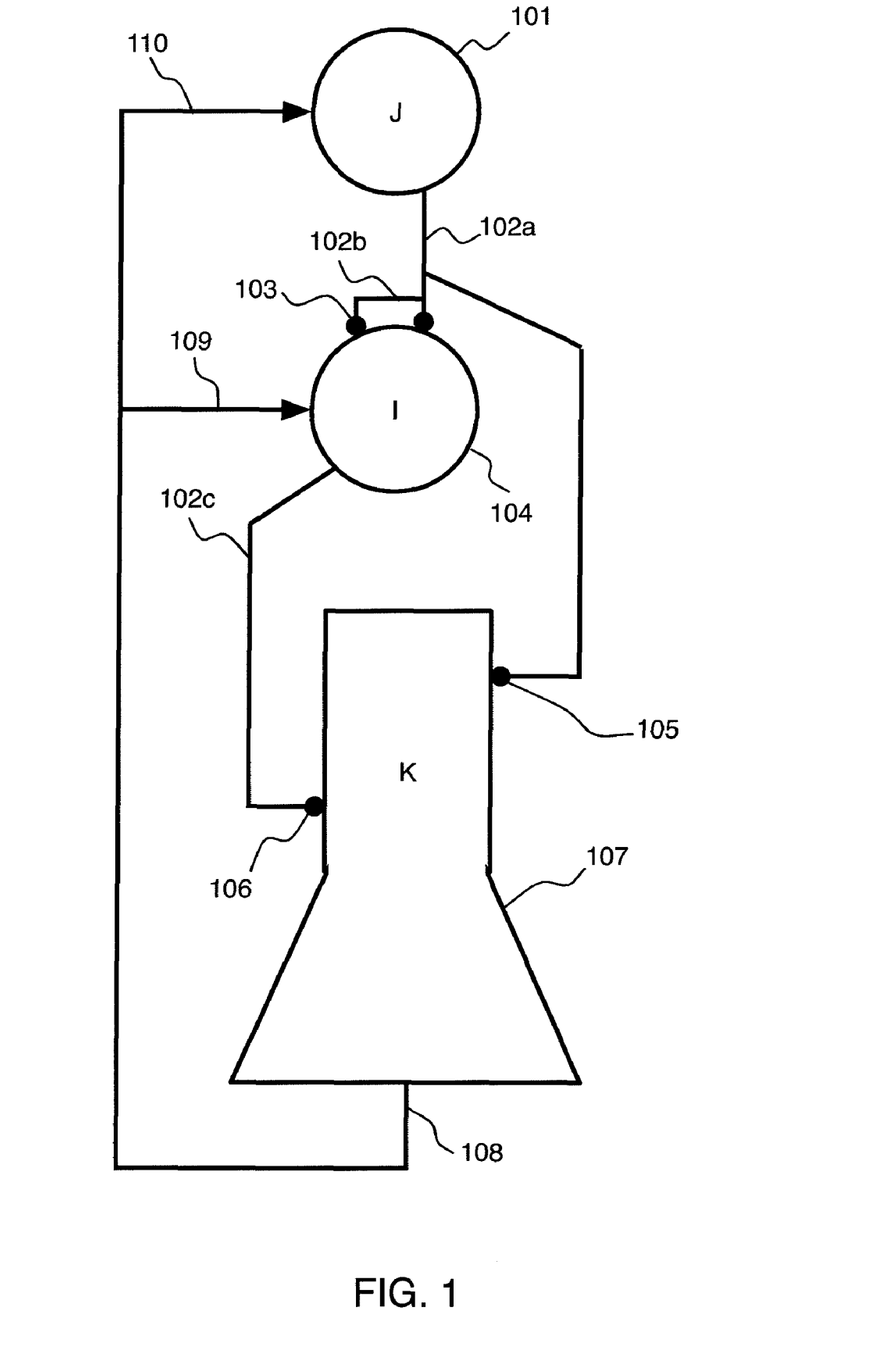
FIG. 1 is an illustration of hardware for proofreading connection updates in hANNs according to the present disclosure.

FIG. 1 is an illustration of hardware for proofreading connection updates in hANNs according to an embodiment of the present disclosure. Two connected neuroids j (101) and i (104) of the hardware ANN are represented as circles; the connection (103) is shown as a black dot. For every connection there is a corresponding "proofreading nousoid" $K_{i,j}$ (107), which receives copies of the signals via wires (102a and 102b) and connections (105 and 106) that the corresponding connection (103) receives. The nousoid output (108) is applied to both the input and output neuroids, j (101) and i (104) respectively, contributing to the connection (103). The nousoid $K_{i,j}$ (107) "proofreads" any weight change at the connection (103), since it only allows changes if the connection (103) and the nousoid (107) concur. It does this by sending approval signals to the connection via the appropriate converging neuroids (101 and 104).

Because both the connections (103, 105, 106) and the nousoid (107) are hardware devices, they can only compute this product approximately. For example, the actual value of the product computed by the connection may differ slightly from the true value, for example because of internal device fluctuations ("Type 1 errors"), or because of coupling between neighboring connections in a densely packed hANN ("type 2 errors"). Similarly, the nousoid may not compute exactly the connectional product, because of device flaws, such as internal noise, conduction delays, parasitic capacities and coupling to other nousoids/neuroids. Only when these 2 imperfect but independent estimates of the same connectional update signal agree with each other within a certain tolerance that the connection is updated by an amount proportional to the product (e.g., to $x_j x_i$). Thus, in the proofreading, if independent estimates of the same information agree, then that information is treated as valid. Proofreading may be used in, for example, connectional updating.

One reason the connections in the hANN cannot accurately compute the function of $x_j$ and $x_i$ specified by the learning rule is that they also have to perform a quite separate, though related, operation: transmitting the weighted input signal to the output neuroid. It is difficult to construct a physical device that rapidly and accurately performs both these tasks.

In the present disclosure, any particular detailed technology for achieving this goal of checking connectional updates by a separate nousoid-like device could be used. Since there are many particular possible implementations of hANNs, using different detailed device configurations, technologies and substrates, only a few examples will be presented here. Given the teachings herein, one of ordinary skill in the related art will be able to contemplate these and similar implementations or configurations of embodiments of the present disclosure.

In a first case a pulse-coded hANN uses binary (0 or 1) neuroid signals. Where the update rule requires that current strengthening occurs if and only if both signals are currently 1—if the connection i,j computes that $x_j x_i = 1$, and the nousoid also computes that $x_j x_i = 1$, then the connection is modified. If either the connection or the nousoid miscomputes, obtaining $1 \times 1 = 0$ for example, then the connection is not changed (see also Table 1). While it may seem impossible that either the connection or the nousoid (which are engineered to accurately do the binary product operation) could ever compute $1 \times 1 = 0$ but this ignores the point that these devices are extremely small (typically, nanoscale) and operate extremely rapidly (millisecond, microsecond, nanosecond, etc.) and will inevitably make rare mistakes. Of course one could always fabricate connections that do not make mistakes (at least over the useful lifetime of the hANN) but these connections would be bulky and expensive, potentially precluding manufacture of brain-like hANNs. Embodiments of the present disclosure allow tiny fast connections to be fabricated (for example, using single-electron transistor technology) and effectively used, since it minimizes the possibility that occasional incorrect connectional updates will cause hANN failure.

Note that the nousoid signal is not used to correct the information being transmitted through the connection. Thus, in the above case, even though the nousoid computes that $1 \times 1 = 0$, the actual input value 1 is sent, after weighting by $w_{ij}$, through the connection, where it contributed to the decision of the output neuroid to take the activity 1. It is implicit that the connection performs two related but separate jobs: transmitting the weighted input activity to the output neuroid, and deciding whether or not to strengthen. Because the connection is a physical device, it may reach contradictory results for these two operations. For example, because a large number of neighboring connections are strengthening, the connection may decide to strengthen even though either the input or output, or even both, are silent; such a contradiction is not possible in a von Neumann computer implementation of a neural network (a software ANN (sANN). In this case the nousoid would detect that the connection was planning, wrongly, to strengthen, and would prevent the execution of the adjustment. The nousoid can be optimized to perform the nonlinear product operation $x_j x_i$, and the connection to perform the linear weighting operation $w_{i,j} x_j$ More generally, the neuroid signals may be continuous-valued, but (as noted in the Background section), the updates are implemented digitally, by applying a threshold criterion to the function of $x_j x_i$. Quasi-continuous valued changes in weights could be achieved by a series of digital changes in weights, which on average conform to the desired learning rule. In the present disclosure, the corresponding nousoid applies the same threshold to the same function of $x_j x_i$. If the two "decisions" to change the connection by the standard digital amount agree, then the update is made; otherwise it is not made. This is achieved by having the nousoid apply "gating" or "enabling" signals to the connection, which approve, okay or "check" the update calculated and proposed by the connection; however, as shown in FIG. 1, these "gating" signals (108) are not applied directly to the connection (103), because this would involve great physical complications that would increase the bulk of the connections, but to the neuroids (101 and 104) contributing to the connection (103); the corresponding gating inputs to these neuroids are 109 and 110. The gating signals are then conveyed to the connections in multiplex form, along the wires that carry the neuroid signals themselves (e.g., along the wire 102). The details of how this multiplexing is done will vary with the particular technology employed in the hANN, but any one experienced with hANNs could devise an appropriate method. Several possibilities are outlined below, as examples.

Even more generally, the nousoid signal could be an analog product of activities, which are sent in multiplexed fashion down the wires to the relevant connections, and compared to the locally computed intended weight changes; the actual weight change made is a suitable average of the locally computed change and the nousoid signals. Given the teachings herein, one of ordinary skill in the related art will be able to contemplate these and similar implementations or configurations of embodiments of the present disclosure.

In most practical applications, including hANNs, however, the weights will be changed in a stepwise manner, so the local decision is either to step or not to step, based on the agreement of the local connectional and feedback nousoid signals. The remainder of this section will focus on this particular case. It should be noted that this instruction is of a "check" or "okay" type: if the instruction does not arrive within a given time period, then the stepping decision computed locally at the connection is not executed. The decision logic is outlined in Table 1.

TABLE 1

A step change in weights (+) is only made when a connection and its nousoid both agree a change should be made.

|  |  | CONNECTION INTERPRETATION OF ARRIVING ACTIVITIES | |
| --- | --- | --- | --- |
|  |  | STEP | NO STEP |
| NOUSOID INTERPRETATION OF ARRIVING ACTIVITIES | STEP | + | – |
|  | NO STEP | – | – |

Figure 2:
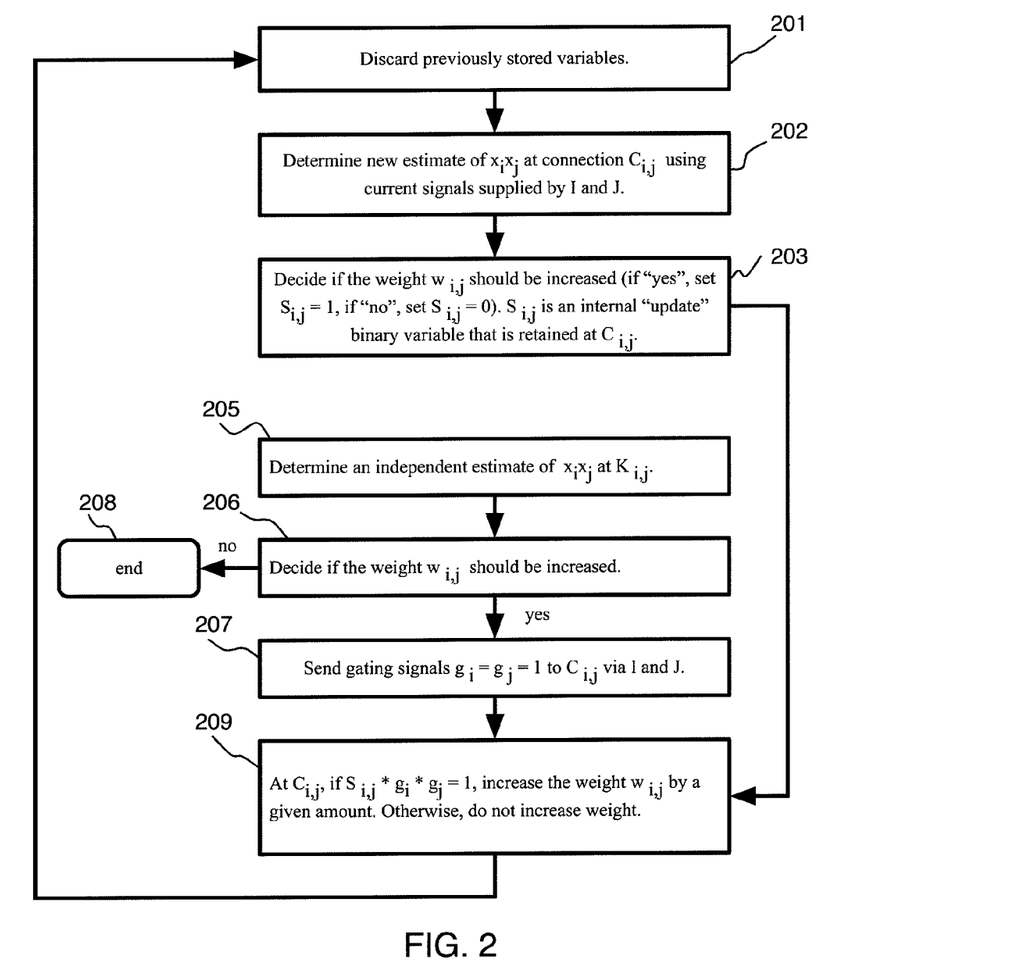
FIG. 2 is a flow chart of a method for proofreading connection updates according to the present disclosure.

It can be seen that the weight is only changed if both the nousoid and the connection agree to change the connection. The nousoid feedback signal is an okay signal (indicated in the table by **); the default condition is that that no nousoid signal arrives (or arrives too late, see below), so the connection remains in its usual "disenabled" condition, and will not execute the draft step even though the connection itself deems that it should occur (for example, if a pulse is present on both sides of the connection, or if the product of the analog activities $x_j$ and $x_i$ exceeds a threshold). Since the connection and the corresponding nousoid make independent weight change estimates, it may seem that it would be logical to make the weight change if the nousoid wants even though the connection does not (on the basis that the connection may be in error but the nousoid not). However, under typical conditions, after most learning has taken place, weight changes should be quite rare, and a much more likely interpretation of this situation is that the nousoid, not the connection, is mistaken. As elaborated below, although the nousoid (like the connection) only very rarely makes mistakes, it will sometimes appear that it makes mistakes, because of the way the nousoid gating signal is fed back to the connection, via the neurons J and I. These neurons also get gating signals belonging to different connections, and occasionally the connection will receive double approval signals that appear to emanate from the relevant nousoid, but in fact originate from Hebbian coincidence or multiplication occurring at other connections. These spurious gating signals will be rare in the typical case, where neuroid activity is very sparse, but when they occur they should not be allowed to override the connection's own estimate of the draft weight change. The opposite scenario, that the nousoid erroneously fails to register a coincidence (or Hebbian multiplication), when the connection does, is most likely due to an error by the connection, which should not therefore be executed, in agreement with Table 1.

The connection calculates and prepares a draft update based on the activity arriving at that connection from the relevant pair of neuroids, but the update is only actually carried out ("printed") if a nousoid check signal arrives to approve or "enable" the change.

A second feature of embodiments of the present disclosure, is that the nousoid check signal is delivered to the connection from both input and output sides. This is shown symbolically in FIG. 1 by the nousoid output (108) being applied to both input and output neuroids (101 and 114, respectively). Arrows are used to depict nousoid inputs (109 and 110): these are not connections in the sense that they deliver weighted activities, instead they modify the nature of the presynaptic activity signals traveling down wires from neuroids to their connections, or cause additional signals that follow the activity signals, or, in the case of (postsynaptic) neuroids receiving connections, they modify the status of those connections. Note that because nousoid signals are delivered to neuroids not to connections they necessarily arrive at all the connections which that neuroid participates in. Thus, although not shown in FIG. 1, the presynaptic input neuroid J (101) will make many other connections than that shown (on other output neurons that are part of the network but not shown), and the "postsynaptic" neuroid I (104) will receive many connections from other neuroids that are not shown. However, an "okay" is only implemented at a connection if both the presynaptic neuron and the postsynaptic neuron receive nousoid signals (indicated in Table 2 by the notation , i.e. nousoid signals present on both input and output sides of the connection). It is this feature that allows the enabling signal to be selectively delivered to the correct connection, despite the fact that there is no physical direct "third wire" going to that connection. This reflects the fact that the connection is, by definition, the unique physical intersection of the two neuroids contributing to that connection. Provided the overall level of nousoid activity is low (low pulse rates of individual nousoids and/or low; few nousoids active, and coincidences and updates are rarely made, almost always the only connections that receive a double nousoid check signal  (denotes $g_{i,j}=1$ in FIG. 2), and that are allowed to strengthen, are those that receive the check signals from the appropriate nousoid. Connections which inadvertently receive double check signals, despite the fact that their own dedicated nousoid is silent (i.e., because the relevant neuroids are participating in other coincidences), will be spuriously enabled; this can be regarded as an error in nousoid operation, but as long as errors are infrequent (the proofreader itself makes few mistakes), the result is an overall considerable enhancement of update accuracy. Furthermore, the learning rule itself could be optimized so that the overall level of coincidence within the network gradually decreases as learning proceeds—the network learns to reduce its own activity, a desirable feature in a hANN, reducing power consumption and operating temperature.

A difficulty of using nousoids to verify that a weight change is appropriate is that the nousoid check signals will only arrive at the connection after a delay. This problem can be handled in various ways, of which two are outlined here. Given the teachings herein, one of ordinary skill in the related art will be able to contemplate these and similar implementations or configurations of embodiments of the present disclosure. In both of these approaches the presynaptic (J or input side) of the connection, which normally carries the longest wire, carries the check signal multiplexed on the activity signal, though the check signal is inevitably delayed with respect to the activity pattern it is appropriate to (i.e., the check signal for one pattern rides on the activity pattern caused by the next pattern). However, it is also possible to use schemes in which separate, sequential (non-multiplexed) activity and check signals are sent. In this context multiplexing implies that some feature of the arriving signals (e.g., their amplitude, phase, sign or pulse statistic other than average frequency) carries the check signal rather than the activity per se. Multiplexing could also be used on the postsynaptic or I side of the connection (see FIG. 1, 104), if the connections are linked by wires to the postsynaptic neuroid, or the check signal could be applied directly to all the connections formed on the neuroid itself, depending on the details of the technology used to construct the hANN. This multiplexing problem is not represented in FIG. 2.

1. In a network where patterns can arrive in any particular temporal order, i.e., where time is not itself a key variable in the computation, then the check signals that originate from nousoids in response to one pattern can be multiplexed onto the activities caused by the next pattern. The connections then interpret the arriving activity, caused by the second pattern, both as an activity corresponding to the current pattern and as an instruction to execute the update initiated by the previous pattern. This is a lagging rule.
2. If time is an explicit variable in the computation, a time-dependent learning rule should be used (e.g., the weight change is not merely a function of the instantaneous value of $x_j x_i$ but of some time-dependent function of the history of $x_j$ and $x_i$ over some suitable temporal window). In this case patterns evolve continuously or discretely in some time-dependent sequence that is problem-dependent but typically smooth. Patterns therefore typically evolve from previous patterns, without sudden jumps. It's therefore possible to apply the check signal derived from a previous time period to the current time period, since the statistical features of the current and previous window will be similar. In the case of discrete time steps, the check signal appropriate to the previous pattern (which arrives at the connection after a delay) is applied to the draft update calculated according to the current pattern. This is a leading rule.

In FIG. 1, the two connected neuroids (101, 104) include an input neuroid J (101) and an output neuroid I (104). The connection $C_{i,j}$ (103) between them is represented as two black dots (the connection may be a single physical device or a collection of devices). In a hANN, typically one wire (e.g., the input wire, 102a) going to the connection (103) is long, and the other (102b) is short. This is symbolized in the diagram by placing the connection (103) on the neuroid (104) itself, but there could be short wires leading to the output sides of connections. The current strength of the connection (103), at time epoch t, is $w_{i,j,t}$. As a result of the activity of the neuroids I and J, this connection strength would, in a conventional hANN, be updated to the value $w_{i,j,t+1}$ at the end of the present time epoch, according to some (possibly nonlinear) function of the current activities ($x_{j,t}$ and $x_{i,t}$) of J and I, possibly together with other signals (such as target signals or reinforcement signals) also arriving at the connection, according to some suitable learning rule. This calculated update is held as a draft, in the form of an internal variable $S_{i,j}$ (typically, but not necessarily, binary, i.e., when the update occurs in all-or-none form) in the connection pending the possible arrival of special approval or "check" signals $g_i$ and $g_j$. This and every other connection is equipped with a corresponding neuron-like unit called a nousoid (107), marked K. Like the connection $C_{i,j}$ (103), the corresponding nousoid $K_{i,j}$ (107) also receives copies of the current values of neuroid activities $x_j$ and $x_i$ via wires 102b and 102c. The nousoid $K_{i,j}$ (107) estimates exactly the same function of ($x_{j,t}$ and $x_{i,t}$) as the connection $C_{i,j}$ (103). The connection (103) implements its changes as a series of digital steps (for example, initiated by the near simultaneous arrival of individual pulses at both sides of the connection). In this case if the connection (103) prepares, as a result of the operation of the learning rule, a draft step, this step is then printed onto the connection as a result of the arrival of check signals from the corresponding nousoid (107). These check signals arrive at both sides of the connection and the draft is only printed (e.g., the weight changed) if the two check signals (ideally, in the sparse coding limit, arriving from the same nousoid (107), as shown in the diagram) approve (e.g., in the case that $S_{ij}$ is a binary variable, the weight is incremented by a given amount if $S_{ij}*g_i*g_j=1$). The check signals calculated by the nousoid (107) are applied to the connection via the feedback inputs on the appropriate neuroids depicted as arrows (109 and 110). The scheme shown in FIG. 1 could be implemented in a variety of technologies, using electrical signals, chemicals, electromagnetic waves, quantum computing, hydraulics etc, or any combination thereof.

FIG. 2 shows a flow diagram of a method for proofreading according to an embodiment of the present disclosure, for the case outlined above. All blocks are executed in appropriate hardware. These blocks are executed in parallel at all the connections and nousoids of the hANN. Blocks 202 and 205 are executed, in parallel, at roughly the same time, though because of propagation delays block 205 can be slower; a new cycle is only initiated only after blocks 205, 206, 207, 209 have executed, e.g., after a predetermined time. In block 202 the connection $C_{i,j}$ receives the signals $x_i$ and $x_j$ from the neuroids I and J. At block 202, an estimate of $x_i$:$x_j$ at connection $C_{i,j}$ is determined using current signals supplied by I and K. At block 203, an internal variable $S_{i,j}$ is determined according a learning rule of the hANN (e.g., in the deterministic or stochastic Hebb rules, $S_{i,j}$ is set to 1 if some function of $x_i$ and $x_j$ exceeds a threshold, to 0 otherwise. Note that in a conventional hANN without proofreading this would immediately be expressed as a step increase in the weight. Here, in the present leading version, $S_{i,j}$ is not immediately expressed but retained as an internal variable until enough time has elapsed for any corresponding approval gating signals $g_i$ and $g_j$ to arrive at $C_{i,j}$. In a lagging version (not illustrated) $S_{i,j}$ need not be retained but is immediately expressed as a step weight increase if both approval gating signals $g_i$ and $g_j$ arrived, and were retained, at $C_{i,j}$ in the preceding cycle.

In parallel, block 202 independently estimates $x_i$:$x_j$ at $K_{i,j}$ (107 in FIG. 1). At block 206, a determination is made about whether the weight $w_{i,j}$ should be increased or not, using its versions of $x_i$ and $x_j$ provided by the branches labeled 105 and 106 in FIG. 1, plus any other relevant signal also used at $C_{i,j}$. In an exemplary case, this follows exactly the same rule as used at $C_{i,j}$ in block 203, however since this is an independent estimate, the outcome may occasionally differ from that in made in block 203, for example, due to errors in $C_{i,j}$ or $K_{i,j}$. Note that in cases where $S_{i,j}$ is not binary, $K_{i,j}$ should still use a binary version (deterministic or stochastic) of the learning rule. In this case it essentially estimates whether a small or large increase in $w_{i,j}$ is appropriate; if a large increase is appropriate, approval gating signals are sent to $C_{i,j}$ at block 207, if not, no signal is sent 208.

Blocks 206-209 show that if $K_{i,j}$ estimates that the weight $w_{i,j}$ should be increased (block 206), approval gating signals $g_i=1$ and $g_j=1$ are sent to the connection $C_{i,j}$ (block 207) via the output branches 109 and 110 (see FIG. 1). Note that there is no need to set the g's to 0 if $K_{i,j}$ estimates that the weight should not change (block 208), since in this case no gating signals are sent to $C_{i,j}$ via J and I (e.g., the default case is that $S_{i,j}$ is not expressed as a weight change, and is discarded before the next cycle; in block 209, at $C_{i,j}$, the weight $w_{i,j}$ is incremented by the previously retained amount $S_{i,j}$ if approval gating signals $g_i$ and $g_j$ arrive at $C_{i,j}$ within a suitable time interval (e.g., a cycle time of the network). If not $S_{i,j}$ is reset to zero pending the arrival of new versions of $x_i$ and $x_j$ in the next time cycle. It's theoretically possible that the signals $g_i$=1 and $g_j$=1 could arrive at $C_{i,j}$ via other gating inputs to I and J from other K nousoids, despite the fact that $K_{i,j}$ did not output them. This is because every I and J neuroid gets many K inputs corresponding to other connections to which they contribute (not shown in FIG. 1). Indeed, in a fully connected network, each J and I neuroid gets gating inputs (such as the arrows 109 and 110 in FIG. 1) from every nousoid.

Nevertheless, if activity is sufficiently sparse (and of course if in non-fully connected networks connections are sparse) it is quite rare that a nousoid emits a g signal; this will be especially the case as network training nears completion (updates are rare); early in training, updates, and spurious enabling of weight changes, are more frequent, increasing the effective learning error rate, but never to a level that would occur in the absence of proofreading. Whether or not $w_{i,j}$ updates as a result of block 209, the network advances, in parallel at all connections and nousoids, to block 201.
Note that this flow diagram gives the logical structure of the proofreading device, but does not attempt to represent the multiplexing that may be needed when wires are long (see above); this is a technical problem to which solutions have been sketched above, and which those skilled in the art should be able to solve.

Figure 3:
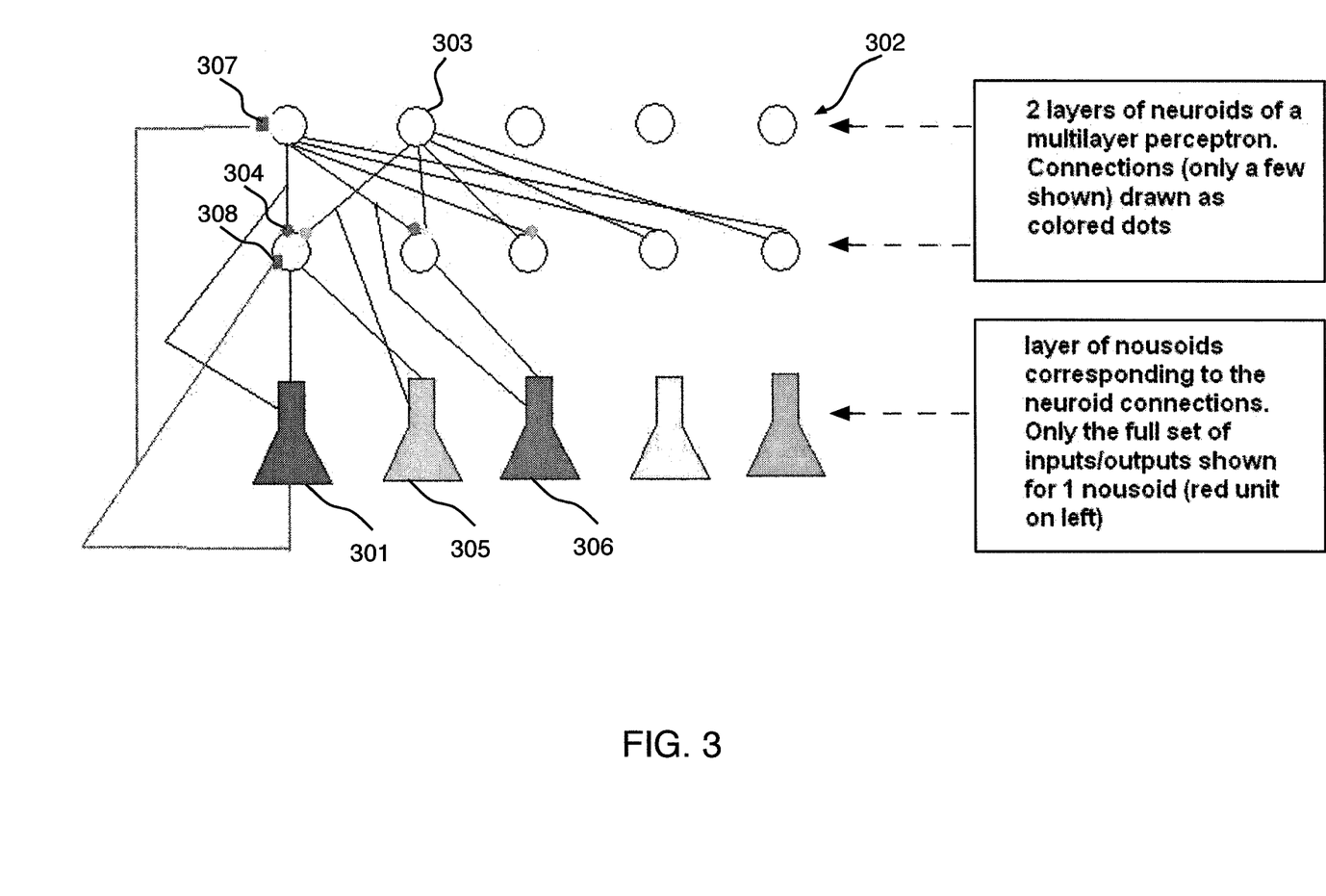
FIG. 3 is an illustration of multiple proofreading nousoids used in conjunction with a hANN.

FIG. 3 illustrates how multiple proofreading nousoids are used in conjunction with a conventional hANN, such that each neuroid connection is equipped with an appropriately linked nousoid.

FIG. 3 illustrates proofreading nousoids, e.g., 301, in a large-scale hardware artificial neural network (hANN). A multilayer perceptron 302 is implemented using hardware neuroids, e.g., 303; only 2 layers are shown for simplicity with only a portion of the corresponding feed-forward connections, e.g., 304. For each connection there is a corresponding hardware proofreading nousoid. All nousoids have the connections illustrated in FIG. 1, but here only the complete input and output connections are shown for only the nousoid 301, and only the input connections for the nousoids 305 and 306. The output connections 307 and 308 provide plasticity-enabling signals for the nousoid 301. Note that each feed-forward neuroid to neuroid connection has a corresponding associated proofreading nousoid, but in hANN, connectivity may not be complete (weak connections are eliminated by pruning) so very large numbers of nousoids may not be required.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

According to an embodiment of the present invention, a computer system for making error-free connection adjustments can comprise, inter alia, a central processing unit (CPU), a memory and an input/output (I/O) interface. The computer system is generally coupled through the I/O interface to a display and various input devices such as a mouse and keyboard. The support circuits can include circuits such as cache, power supplies, clock circuits, and a communications bus. The memory can include random access memory (RAM), read only memory (ROM), disk drive, tape drive, etc., or a combination thereof. Embodiments of the present disclosure can be implemented as a routine that is stored in memory and executed by the CPU to process the signal from the signal source. As such, the computer system is a general purpose computer system that becomes a specific purpose computer system when executing the routine of the present invention.

The computer platform also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

What is claimed is:

1. A hardware-implemented method for proofreading updates of connections in a hardware artificial neural network (hANN), comprising the steps of:
computing a draft weight change independently at a connection between neuroids and at a corresponding dedicated special purpose nousoid; and
determining whether the draft weight changes agree; and
executing a weight change at the connection equal to the draft weight change upon determining that the draft weight changes agree.

2. The hardware-implemented method of claim 1, wherein the nousoid performs an operation on signals of neuroids, wherein the neuroids compute the hANN in a massively parallel fashion.

3. The hardware-implemented method of claim 1, wherein the operation is one of multiplication and coincidence.

4. The hardware-implemented method of claim 1, wherein the nousoid sends a selective gating signal approving the weight change to the connection via the neuroids.

5. The hardware-implemented method of claim 4, wherein the selective gating signal permits an execution of the draft weight change in a the connection between neuroids.

6. A computer readable medium embodying instructions executable by a processor to perform a method for proofreading updates of connections in a hardware artificial neural network (hANN), the method steps comprising:
computing a draft weight change independently at a connection between neuroids and at a corresponding dedicated special purpose nousoid; and
determining whether the draft weight changes agree; and
executing a weight change at the connection equal to the draft weight change upon determining that the draft weight changes agree.

7. The computer readable medium of claim 6, wherein the nousoid performs an operation on signals of neuroids, wherein the neuroids compute the hANN in a massively parallel fashion.

8. The computer readable medium of claim 6, wherein the operation is one of multiplication and coincidence.

9. The computer readable medium of claim 6, wherein the nousoid sends a selective gating signal approving the weight change to the connection via the neuroids.

10. The computer readable medium of claim 9, wherein the selective gating signal permits an execution of the draft weight change in a the connection between neuroids.

11. A hardware artificial neural network (hANN) comprising:
   a plurality of pairs of neuroids connected by a connection;
   a plurality of nousoids corresponding to the pairs of neuroids, wherein each nousoid is connected to the connection between a corresponding pair of neroids and is separately connected to an output of one of the neroids of the corresponding pair of neroids, each nousoids for computing a draft weight change independently of corresponding pair of neroids and determining whether the draft weight change agrees with a second draft weight change determined by corresponding pair of neroids, and
   wherein the corresponding pair of neroids executes a weight change at the connection equal to the draft weight change upon a determination that the draft weight changes agree.

12. The hANN of claim 11, further comprising a connection from an output of each nousoid to each of the corresponding pair of neroids.

* * * * *